(12) United States Patent
Miller et al.

(10) Patent No.: US 7,504,936 B2
(45) Date of Patent: Mar. 17, 2009

(54) METHOD AND APPARATUS FOR DYNAMICALLY PRIORITIZE NETWORK FAULTS BASED ON REAL-TIME SERVICE DEGRADATION

(75) Inventors: Frank D. Miller, Lake Zurich, IL (US); Jesse M. Keeler, Tempe, AZ (US); David J. Ness Cohn, Morton Grove, IL (US)

(73) Assignee: Motorola Inc., Schaumburg, IL (US)

( * ) Notice: Subject to any disclaimer, the term of this patent is extended or adjusted under 35 U.S.C. 154(b) by 87 days.

(21) Appl. No.: 11/375,217

(22) Filed: Mar. 14, 2006

(65) Prior Publication Data

US 2007/0222576 A1    Sep. 27, 2007

(51) Int. Cl.
*G08B 29/00* (2006.01)
(52) U.S. Cl. .................. 340/506; 340/511; 340/3.1; 340/825.36; 340/825.49
(58) Field of Classification Search .......... 340/506, 340/507, 508, 511, 519, 517, 521, 3.1, 3.43, 340/825.36, 825.49
See application file for complete search history.

(56) References Cited

U.S. PATENT DOCUMENTS

| 4,812,819 A | * | 3/1989 | Corsberg ................. 340/517 |
| 4,816,208 A | * | 3/1989 | Woods et al. ............. 376/259 |
| 5,400,246 A | * | 3/1995 | Wilson et al. ............. 700/17 |
| 5,748,098 A | * | 5/1998 | Grace ...................... 370/242 |
| 5,768,119 A | * | 6/1998 | Havekost et al. ........... 700/4 |
| 5,892,440 A | * | 4/1999 | Bryan ....................... 340/524 |
| 7,246,516 B2 | * | 7/2007 | Ropital et al. .............. 73/86 |

* cited by examiner

*Primary Examiner*—Daryl C Pope (57) ABSTRACT

A method and apparatus of an alarm management system (114) for dynamically prioritizing network conditions for a communication system (100) is disclosed. The alarm management system includes a receiver (116) and processor (118) for receiving one of a plurality of alarm conditions indicating a fault in a device within the communication system and classifying the alarm condition. The alarm management system also determines a status of the device and rates the alarm by comparing the classification of the alarm condition with the status of the device. The rated alarm condition can then be ranked against another of the plurality of alarms. The alarm management system then re-evaluates the ranking of alarm condition by repeating the determining and rating steps and then ranks the re-evaluated rated alarm condition against other alarm conditions.

20 Claims, 7 Drawing Sheets

METHOD AND APPARATUS FOR DYNAMICALLY PRIORITIZE NETWORK FAULTS BASED ON REAL-TIME SERVICE DEGRADATION

FIELD OF THE INVENTION

The present invention relates generally to a network fault detection system and in particular a method and apparatus to dynamically provide network faults based on real-time service conditions.

BACKGROUND

Networks or systems and in particular communication networks are made up of many different devices that can be located in disparate places and that can perform different functions. As a system, these devices work together to provide the services of the network, such as a wireless communication network. Regardless of the number of devices within the system, it is not possible to expect that every device will operate flawlessly or continuously. Disruptions, errors and faults occur and are to be expected.

Accordingly, network producers and operators have designed, developed and operate various network and alarm management systems that work with the network to detect, identify, characterize and resolve network disruptions, errors, and faults and to monitor the performance and configuration of the network. Typically, alarm management systems use alarms to notify a network developer or operator that there is a problem or issue with the system. These alarms can identify the disruption, error or fault and present them to the operator, but they are primarily based on a fixed or static set of alarm severities, such as critical or warning. These alarm severities and notifications inform the operator of the system or the alarm management system to the potential magnitude of an alarm and the nature of the alarm. Once an alarm assessment has been characterized, the characterization stays associated with the alarm condition. The operator is then left to prioritize the alarms according to the original assessment.

There are numerous issues that are presented by currently available alarm management systems. As the alarm conditions are static, an operator who is trying to resolve alarm conditions in the network does not necessarily have current or accurate information. For example, an alarm condition can be initially assessed as a "warning" but over time the alarm condition can become more severe depending on the nature of the alarm condition and its impact on other network devices and the system. Regardless of what the current alarm condition may be, the operator is still operating the alarm management system as if the alarm condition and its original assessment as a "warning." Additional alarm conditions that are related to the original warning alarm condition may be needed to notify the operator that severity of the original warning alarm has changed. While the original alarm condition is waiting to be resolved, the operator is working on other alarm conditions that may have been rated more critical when first assessed and that are not as critical at the time of resolution. Thus, the operator may be resolving an alarm condition that is not as critical as another alarm condition because no new data regarding the alarm conditions is available.

Presentations of alarm conditions can be arranged in any number of ways. A first-in-time arrangement can be used whereby the alarms are arranged according to the time that they arrived. The operator is then left to sort and prioritize the alarms according to severity without the assistance of the alarm management system. In addition, this configuration of sorting may not present a critical alarm because the previous alarm conditions may not permit continual display of the latest alarm conditions. The format of the display may also make it difficult for an operator to find critical alarms as the notification mechanism may be buried within other alarm data making it hard to find critical alarms conditions.

Once an alarm condition is detected and presented to an operator, current systems continue to display the alarm until it is resolved. In order for the alarm condition to be deleted from a list, an operator therefore is required to access the alarm system and resolve the alarm or force the system to say that the alarm is resolved even if it has not been. This increases the work requirements for the alarm management system operators. This also does not present an accurate account of the alarm conditions to the operator.

To the extent that current alarm management systems prioritize alarm conditions, these prioritizations are primarily done against other current alarm conditions. In other words, the severity level of a new alarm conditions is determined and then it is compared against other alarm conditions that are active. When another new alarm condition occurs, the relative ranking of the prior alarm conditions may change depending on the placement of the new alarm condition. The rating and ranking of alarm conditions are therefore without reference to additional sources other than alarm conditions and their ranking.

In addition to these issues with current systems, alarm conditions are first rated and those having the same rating, e.g. critical, non-critical, etc., may be categorized together. Once in a category of similarly rated alarm conditions, current systems do not subdivide the alarm conditions so that an operator knows which of a critical alarm may have the most impact to the monitored system if not resolved. Therefore, an operator is left to rely on subjective experience to know which alarm conditions need to be resolved. As discussed, there is limited amount of data presented about the alarm conditions for a operator to be able to make the most appropriate decisions on which is the most critical alarm.

In view of the foregoing, an alarm management system is needed that can dynamically rate an alarm condition against other alarm conditions where alarm conditions are continually being ranked against new and old alarm conditions and other network information. In addition, an alarm management system is needed that can rank new and old alarm conditions against one another to be presented to an operator for resolution. The alarm management system is also needed to be able to rate and rank alarm conditions against additional considerations.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to dynamically prioritizing network faults and alarms according to real-time conditions including service degradations. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a method and system to dynamically prioritizing network faults and alarms according to real-time conditions including service degradations described herein. The non-processor circuits may include, but are not limited to, a radio receiver, a radio transmitter, signal drivers, clock circuits, power source circuits, and operator input devices. As such, these functions may be interpreted as steps of a method to perform dynamically prioritizing network faults and alarms according to real-time conditions including service degradations. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention provides a method of dynamically prioritizing network conditions for a system including a wireless communication system. The method includes receiving one of a plurality of alarm conditions indicating a disruption, fault or error in a device within the system. An alarm condition can also be considered to be data regarding network performance and network configuration and is understood herein to both alert an operator to issues within the network as well as data regarding the network. The alarm conditions may have an adverse impact on the operation of the system. The method continues to classify the alarm condition as one of among several different alarm conditions including warnings, non-actionable alarms, actionable alarms and system impacting alarms. In addition, the status of the device and related peer devices within its resource pool to which the alarm condition is associated is determined so that that the present invention knows what is happening with that device and related peer devices available to meet resource demand. Thus, present invention knows that the device is operational, non-operational or how the alarm condition is impacting the device and the system.

A rating of the alarm condition is then made by comparing the classification of the alarm condition with the status of the device reporting the alarm and the devices within the same resource group or pool. Thus, the impact of the alarm condition can be understood. Once the rating of the alarm condition is made, the alarm condition can be ranked against other alarm conditions that have been made. As an example, an alarm condition having a rating indicating a significant impact on the system will be ranked higher than alarm conditions that have a less significant impact on the system.

On an ongoing basis, the present invention will continue to re-evaluate the ranking of alarm condition by repeating the steps that determine current required resource demand on the device and its related peer devices in the available resource pool and rate the alarm condition. Once these steps are repeated, the method continues by ranking the re-evaluated alarm condition against other alarm conditions. As can be appreciated, the ranking and re-ranking of alarm conditions is dynamically performed for each alarm condition such that the rankings of all alarm conditions may be changing on an ongoing basis. The method can also include determinations and comparisons to past system and device performance. This provides for a better understanding of an alarm condition to the overall system and with respect to other alarm conditions.

A dynamic alarm management system is also provided by the present invention. The alarm system includes a receiver that obtains alarm conditions of at least one of the devices that is included in the system that the alarm management system monitors. A processor is also provided that is coupled to the receiver and processes the alarm conditions as they are received, as additional alarm conditions are received and periodically after the alarm condition is initially received. To dynamically process each alarm condition, the processor classifies the alarm condition as one of several different classifications. The classification may include a severity level of the alarm such that an outage of a network device would be classified as a high impact condition while an error is data transmission may be classified as a non-actionable alarm condition.

The processor will also determine the status of the device and peer devices within the resource group reporting the alarm. Such a status could include that the device is either operational or non-operational and may also consider past performances of the device. Once the status of the device is determined, the processor rates the alarm condition by comparing the classification of the alarm condition with the status of the device and peer devices within the resource group. This rating provides additional value to the original classification of the alarm condition by taking into account different factors. These factors can include prior alarm conditions on the device, current and past network conditions and usages, etc. The rating of the alarm condition is then ranked against other alarm conditions that have been processed or are being processed.

As the processor operates to dynamically evaluate alarm conditions, rated alarm conditions are re-evaluated by repeatedly determining the required resource demand on the device and peer devices within the resource group and rating the alarm condition by comparing the available resources against the needed resources for the device with the classification of the alarm condition. The processor then reranks the re-evaluated alarm conditions against one another. In an embodiment of the present invention, a display is also included that can present the ranked and reranked alarm condition to an operator of the network so that the alarm conditions can be resolved.

Figure 1:
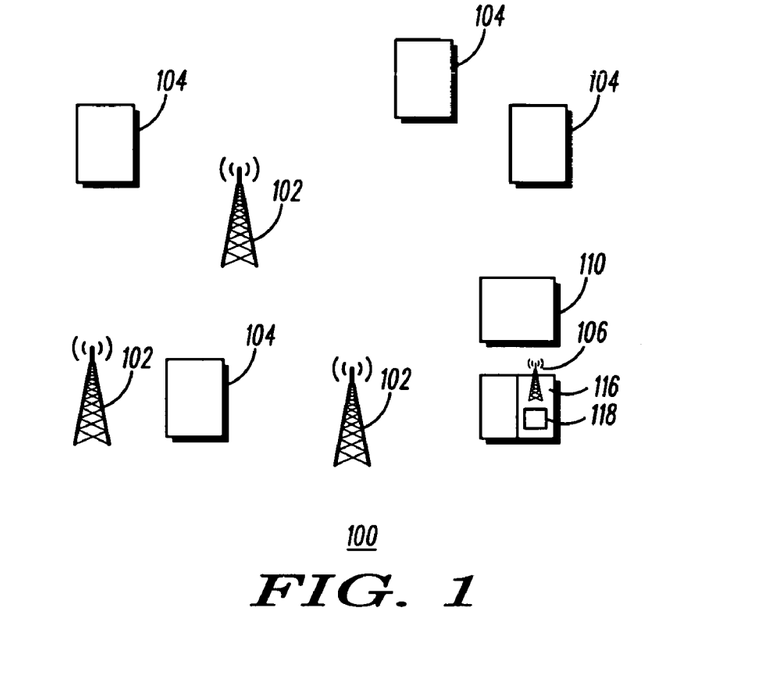
FIG. 1 is an example of a block diagram of a wireless communication system and network that utilizes some embodiments of the present invention.

Referring to FIG. 1, block diagram of a system 100 that uses the dynamic alarm management system of the present invention is shown. While the present invention applies to any system that has multiple devices that operate with one another to create a system, the present invention is described in the context of a wireless communication system such as a code division multiple access (CDMA), global system of mobile communication system (GSM) or universal mobile telecommunication system (UMTS) cellular communication system. The system 100 includes a plurality of base stations 102 that communicate over wireless channels with multiple mobile stations 104. The system may also include a plurality of network devices that operate with base stations 102 to effectuate the mobile communications. These network devices include mobile switching centers 108 that are coupled to the base stations to control the communications between the base stations 102 and mobile stations 104. In addition, gateways 110 may be provided that link the system 100 with other communication systems that are controlled by different network devices.

Figure 2:
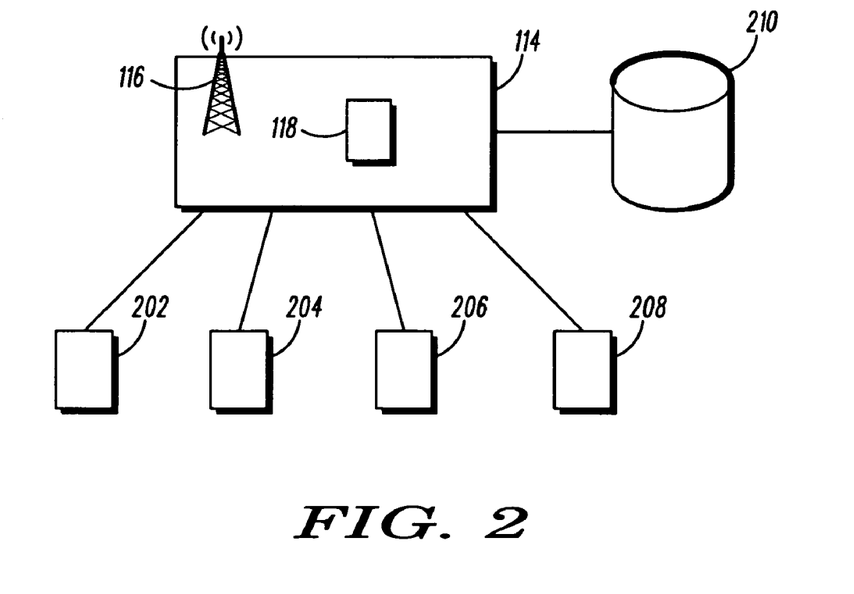
FIG. 2 is an example of an alarm management system in accordance with the principles of the present invention.

The system also includes devices 112 to monitor the performance of the overall system. Devices 112 may include an alarm management system 114 of the present invention. The alarm management system 114 may include a receiver 116 that receives data regarding the performance of the devices within the network including alarm conditions that are detected by the devices or by components of the alarm management system 114. In addition, the alarm management system includes a processor 118 that is coupled to the receiver 116 to process the alarm conditions received by the system. FIG. 2 provides a block diagram of the alarm management system 114 of the present invention and the components that provide the functionality to dynamically monitor alarm conditions in the system 100. The alarm management system can include a number of different monitoring systems including, but not limited to, fault management system 202, performance management system 204, configuration management system 206 and a problem management system 208. These systems are used by network engineers, planners, managers and technicians that monitor the system 100 and detect and resolve alarm conditions. The alarm management system also includes a data repository 210 that stores data received, used and created by the alarm management system.

Figure 3:
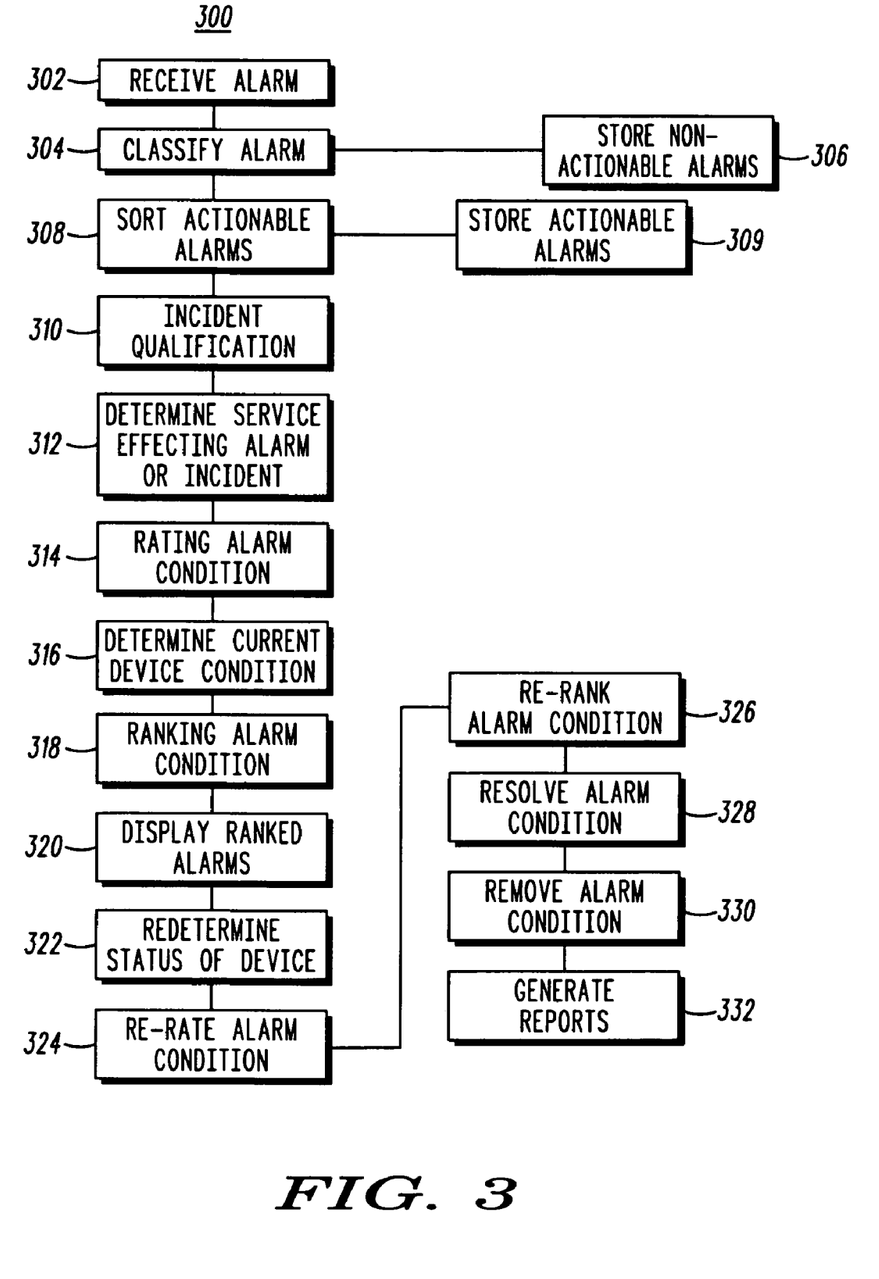
FIG. 3 is a flow chart illustrating a method for prioritizing alarms and faults based on real-time factors in accordance with the principles of the present invention.

FIG. 3 illustrates a flow chart of the process 300 used by the alarm management system 114 in accordance with the principles of the present invention. The alarm management system receives 302 through receiver 116 an alarm condition that has been detected within system 100. The alarm condition can be detected by any of the various monitoring systems deployed throughout the system 100 including the fault management system 202, the performance management system 204, the configuration management system 206 and the problem management system 208 or any other system that is used within system 100. In addition, alarms conditions can be detected by the network devices including but not limited to the base stations 102, mobile stations 104 and mobile switching center 106. The alarm conditions received by the alarm management system 114 can include, but are not limited to, outages of devices, errors created by such devices, transmission errors, performance data and configuration data. The various alarm conditions that are received are then processed by the processor 118.

To begin processing the alarm conditions, the method classifies 304 the alarm conditions. To classify the alarm condition, the processor categorizes the received alarm condition into a number of different alarm condition classifications such as non-actionable and actionable alarm conditions. The classification process can include throttle and threshold filter processes, which will be discussed in more detail below. In an embodiment of the present invention, the alarm conditions that are classified as non-actionable can be discarded or can be stored 306 as a part of data repository to be used as the alarm management system. Non-actionable alarms can be considered alarms that are notifying one of the monitoring systems of network conditions that may not adversely affect the operation of the system or the device but are monitored for statistical purposes and the like. Non-actionable alarms can also be alarms that cannot be addressed by the resolution devices and methods available to the alarm management system 114. In addition, non-actionable alarms may be those alarms that the system 114 cannot resolve at some point in time because of other circumstances and that will be resolved or become moot because of an elapse in time.

While non-actionable alarms are stored as a part of the data repository, the alarm conditions that are classified as actionable alarms are further monitored by an actionable alarm monitor process. The actionable alarm monitor sorts 308 actionable alarms into actual alarm conditions for action and actionable alarms that are not to be acted upon at the time of the sorting. An example of sorting actionable alarms includes temporarily suppressing certain types of alarm conditions depending on variable settings in the alarm condition system 114 or on conditions within the system 100 or system devices. In addition, certain alarm conditions may have auto recovery options that the alarm conditioning system 100 can initiate without the need to alert a network operator. The results of the sorting step 308 are alarm conditions that the alarm management system may be required to take action on. The actionable alarms that can also be stored 309 in the data repository 210 with those non-actionable alarms that were stored. These stored alarm conditions can be used for statistical purposes or for use in other parts of the present invention as discussed in more detail below.

As a result of the classification and sorting described above, the alarm management system 114 has created a set of actionable-potential incidents, or incidents upon which the system 114 may act. Further sorting is then performed as a part of incident qualification 310. As described in more detail below, incident qualification determines 312 via the configuration and state of the system 100 and the devices within the system whether the actionable alarm can be service affecting. Like non-actionable alarms, non-service affecting alarms are stored as a part of the data repository. These non-service affecting alarms are stored as actionable alarms as action can be taken and may be taken when other service affecting alarms are resolved or are in the process of being resolved. Service affecting alarms are also stored as a part of the data repository 210 and noted as to the classification. These service affecting alarms can be stored and known as incidents. Thus, as a part of the classification of the alarm conditions, different types of alarms are determined according to various parameters and a record of the classified alarm conditions are stored in the data repository for use by the system in the continued classification of alarm conditions and for rating and ranking of these alarm conditions.

As can be appreciated, incidents that affect service of the system 100 need to be resolved before other actionable and non-actionable alarms. Regardless of the classification of an alarm condition, the alarm condition needs to be rated and ranked. In an embodiment of the present invention, service affecting alarm conditions are rated. It is understood that actionable and non-actionable alarms can likewise be rated. Rating 314 of alarm conditions according to the principles of the present invention looks to number of factors including but not limited to comparing the classified alarm condition to quality of service impacts. Quality of service impacts may include determining 316 the current conditions of the device reporting the alarm condition as well as devices that operate with or affected by the device reporting the alarm condition. Such current conditions may include the load on the device. For example, a base station that has reported an alarm condition may be located near a highway during rush hour, or the base station may be located in a farmer's field around midnight. The impact of the same alarm condition on each of these base stations is very different. In addition, the effect on the highway base station during rush hour and during night time hours may be very different.

Thus to rate the impact of alarm condition, the condition or status of the device is determined. In one embodiment, the alarm management system sends a message to the reporting device to send quality of service data to the system 114. It is possible that similar messages are sent to other devices to obtain a more complete understanding of the impact of the alarm condition on the system 100 or parts of that system. In another embodiment, the management system 202-208 reporting the incident acquires the then current device conditions and status. The alarm condition and device status are then jointly sent to the alarm management system 114 simultaneously. The history of the device reporting the alarm condition can be included in the process by reviewing the data repository 210. This review will determine if the device has experienced similar alarm conditions under similar circumstances in the past, which could indicate that the alarm condition is chronic and regardless of its severity attempts should be made to resolve it, or that the device has had an excessive number of alarms, which could indicate that there is a general problem with the device. The data repository 210 has detailed information regarding the device and alarm conditions over a period of a given period time.

As described, the present invention determines the status of the device having the alarm condition. In addition, the present invention can determine the status of a resource pool of devices that operate together within the system 100 or a group of resources. This can effect the determination of the device status because other resources and devices within the resource pool or group can compensate for or further accentuate the alarm condition. For example, a base station 102 within a cell having multiple base stations 102 can experience an alarm condition. If the other base stations within the cell can compensate for the base station 102 reporting the alarm, the status of the resource pool can be less severe than the status of the base station 102 standing alone. Alternatively, if the alarm condition is reported for a switching center 106 that affects multiple base stations 102, the status of the resource pool may be more severe than for the switching center 106 standing alone.

The alarm management system 114 then rates the alarm condition by comparing the classification of the alarm condition with the status and condition of the device. Thus, for example, the same alarm condition of a base station 102 will have a higher rating when the traffic on the device is higher than another time when the traffic on the device is lower.

Rated alarm conditions then can be ranked 318 by the alarm management system. Ranking is performed by comparing the rating of one alarm condition with other alarm conditions. The alarm condition that will have the most impact on the system is given a ranking that reflects that impact. When each new alarm condition has been rated as described above, it is ranked against the other rated and ranked alarm conditions. The alarm conditions with the highest ranking, which are the alarm conditions that have the biggest impact, can be displayed 320 to the operators of the system 100 and the management systems 202-208. Any given number of ranked alarm conditions can be displayed.

To increase the functionality of the present invention and to make the ranking dynamic, the present invention repeats steps described above to make sure that the original assessments are still appropriate. Accordingly, an embodiment of the present invention dynamically ranks each alarm condition by re-determining 322 the status of the device reporting the alarm condition and re-rating 324 the alarm condition by comparing the classification of the alarm condition with the status of the device. With this redetermined and rerated alarm condition it can be re-ranked 326 against other alarm conditions. An alarm condition can be reported at one time when the affect of that alarm condition may not be overtly adverse to the device or the system, such a being reported at low usage times during the day. But as the usage increases on the device affected by the alarm conditions, the impact may increase while the impact may be decreasing on other devices. For example the impact of an alarm condition increases in the business district of a city as the impact decreases on the outlying areas of a highway leading into the city during morning rush hours. Thus, a low rated alarm condition at 5:00 am may be a high rated alarm condition at 9:00 am because of the increased traffic. The dynamic feature of the present invention can be scheduled to operate as new alarm conditions are received or on a periodic basis, e.g. on a given time interval.

An operator of the system 100 and the management systems 202-208 may select the most appropriate alarm condition for resolution. The selected alarm condition can be highest ranked alarm condition or another alarm condition that has been ranked. The operator then performs the necessary steps to resolve 328 the alarm condition. As alarm conditions are resolved, they are removed 330 from the display and removed from the ranking. Periodically during operation of the alarm management system 114 reports are generated 332. One such report can be a consolidated information report that has all the historical information relevant to an incident, including but not limited to real time status of relevant devices. Another report can be a problem resolution report, which is a summary report capturing dialing activity of the problem resolution management system. Similar reports can be generated by the other management systems 202-208.

Figure 4:
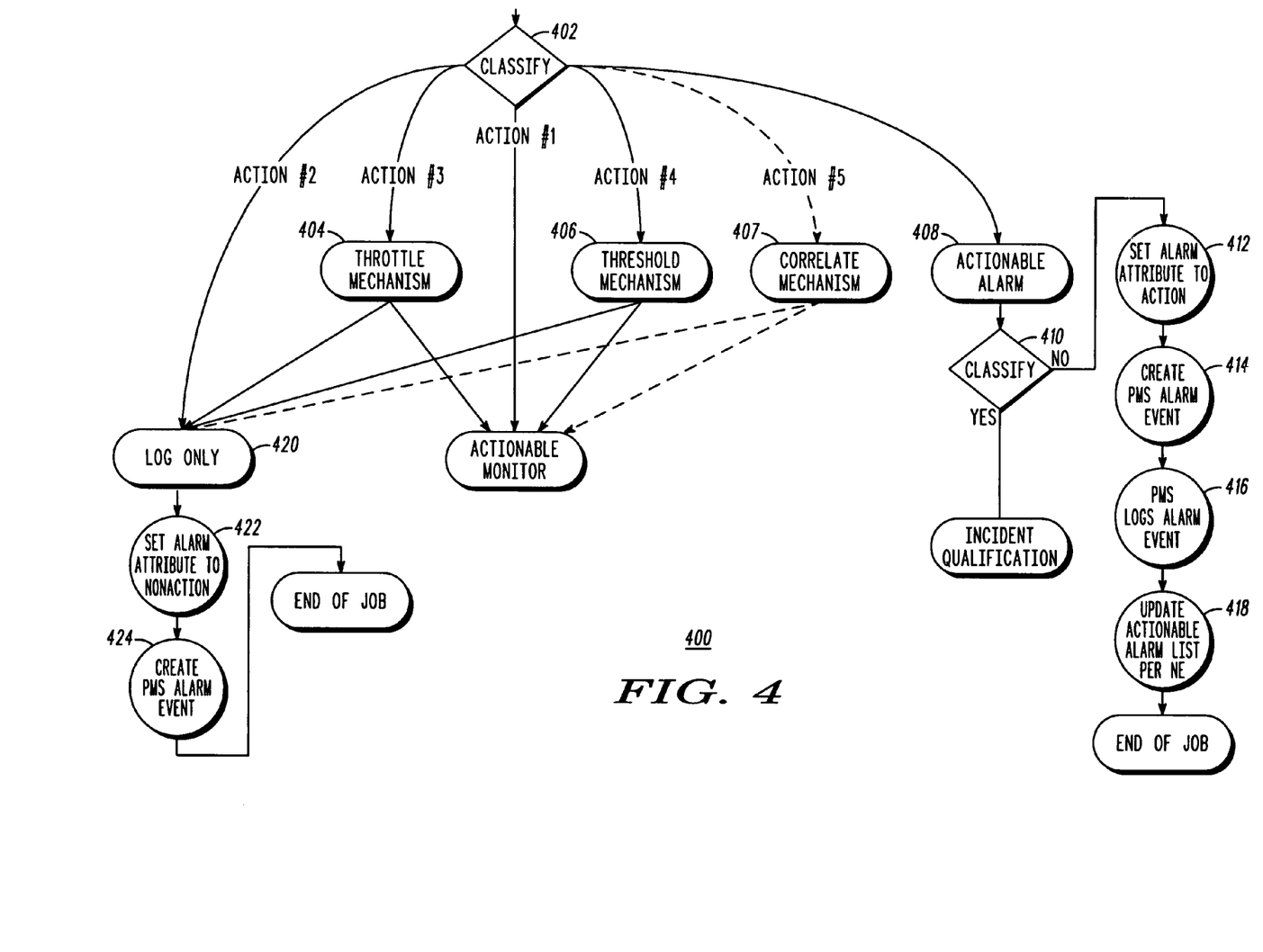
FIG. 4 is a flow chart illustrating a method of classifying alarm conditions in accordance with the principles of the present invention.

FIG. 4 is a flow chart for the steps of classifying 400 the alarm conditions that are presented to the alarm management system 114 of the present invention. As stated, when alarm condition is reported to the alarm management system 114, it is classified 402 as an actionable alarm condition or a non-actionable alarm condition. Actionable alarm conditions are then throttled 404 to reduce the quantity of repeat alarms. The original alarm condition is therefore denoted as the alarm condition and the repeated alarm conditions are noted as non-actionable alarms. The actionable alarms can also be thresholded 406 that counts the occurrences of a given alarm condition for a specific device over a set time frame to determine if the quantity of the alarm condition justifies the escalation of the alarm to an actionable. When the threshold is not met, then the alarm condition is made non-actionable. It is also possible to correlate 407 the alarm conditions by sorting out which is the primary alarm in a multi-alarm incident. Thus secondary alarms in the multi-alarm incident can be suppressed while primary alarms can be resolved. Alarms can also be classified immediately as an actionable alarm condition 408 without any preprocessing. Actionable alarm conditions can be further escalated to become an incident 410 and are further processed by incident qualification, which is described below.

For actionable alarms that are not escalated further, the actionable alarm condition can then be treated as an actionable alarm. The alarm management system 114 can set 412 an alarm attribute to action and create 414 a performance management (PMS) alarm event for storage 416. The alarm management system then updated 418 the actionable alarm list for the specific network element that the device is a member of.

Non-actionable alarms and those alarms that are determined to be non-actionable by the throttle, threshold and correlating mechanism are first logged 420 according to their classification and other relevant information into the data repository 210. The alarm management system 114 can set 422 an alarm attribute to nonaction and create 424 a performance management system (PMS) alarm event for storage.

Figure 5:
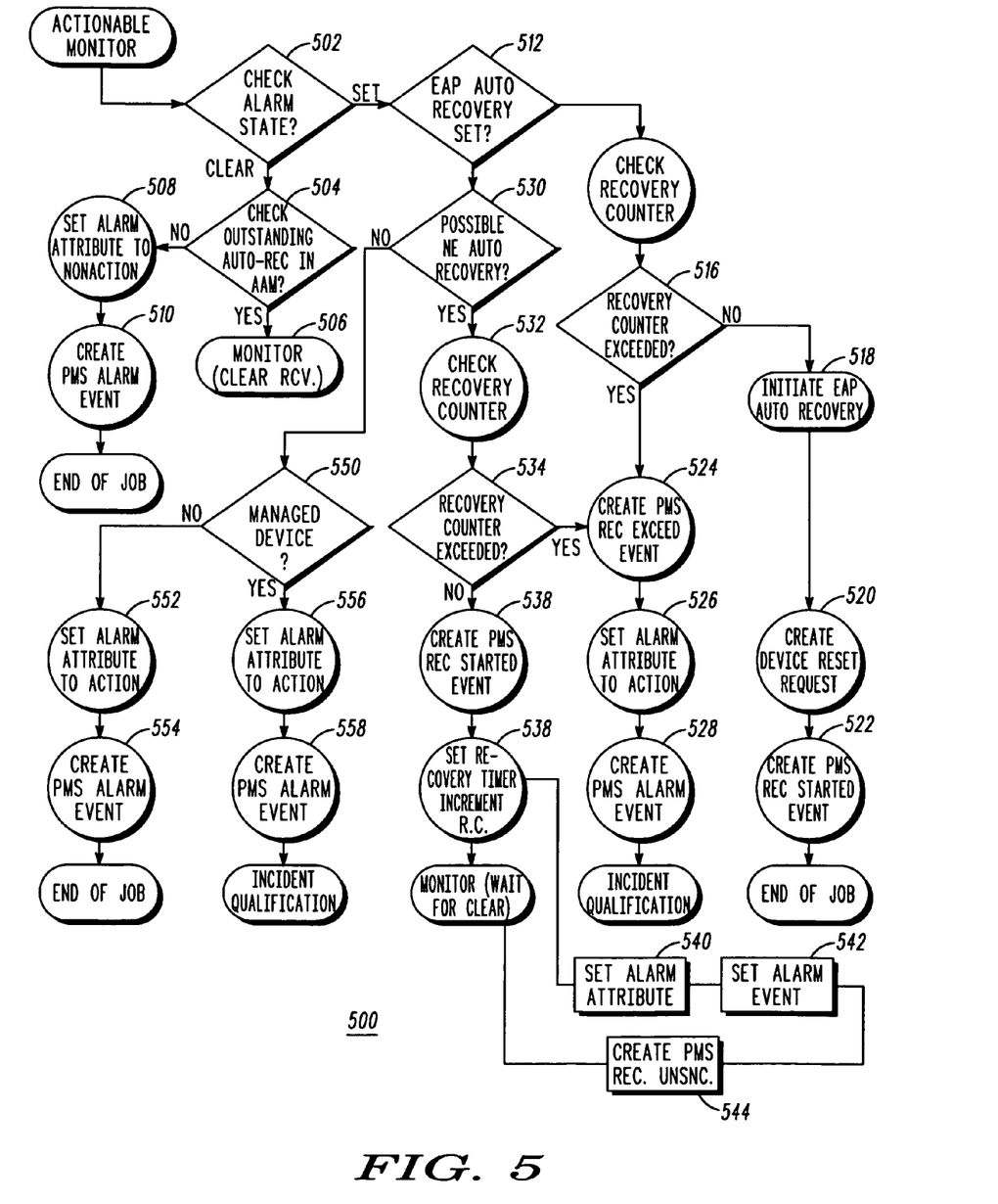
FIG. 5 is a flow chart illustrating the steps of an actionable alarm monitor performed in accordance with the principles of the present invention.

For those alarms that are noted as actionable after the alarm condition has been throttled, thresholded and correlated, the alarms are further classified by enhanced alarm processing system (EAP), which is a part of the alarm management system 114, the method of which is shown in FIG. 5. The EAP begins by checking 502 the alarm state of the actionable alarm. If the alarm state set is for clear, the EAP checks 504 for any outstanding auto-recovery incidents in the actionable alarm monitor of the alarm management system 114. As mentioned an auto-recovery alarm is an alarm condition that is resolved without the assistance of the alarm management system 114 or an operator and is resolved automatically by a management system or a device. If so, these alarms are continued to be monitored 506 as will be described in connection with FIG. 6. If there are no outstanding auto recovery incidents, the EAP sets 508 the alarm attribute to nonaction and creates 510 a PMS alarm event for storage. The process for alarm condition is therefore concluded.

For those alarm states that are determined to have an alarm state as set, the EAP determines 512 if auto recovery for the alarm is set. If the alarm recovery is set, the EAP checks 514 the recovery counter for the device reporting the alarm condition and determines if the recovery counter is exceeded. The recovery counter indicates the number of times a particular alarm condition has occurred. If the recovery counter has not been exceeded, then the EAP will initiate 518 auto recovery for the device. Auto recovery is the process by which the device and the alarm management system 114 resolve the alarm condition without the intervention of other resources within and without the system. A device reset request is the created 520 for the alarm condition, and PMS alarm event is created 522. If the recovery counter has been exceeded, a PMS recovery exceeded event is created 524 and the alarm attribute to the action is set 526 so that a PMS alarm event is created 528. The EAP then proceeds to incident qualification as described below.

Returning to step 512 when the determination that auto recovery is set, it is determined 530 if it is possible for the network element to perform auto recovery if the auto recovery is not set. If it is possible for network element or device auto recovery, the EAP checks 532 a recovery counter and determines if the recovery counter has been exceeded 534. If the counter is exceeded, then the EAP creates a PMS recovery exceed event 524 and proceeds with steps 526 and 528 before starting the incident qualification process described below. If the recovery counter is not exceeded, then the EAP creates 536 a PMS recovery started event and sets 538 the recovery timer and increments the recovery counter. The EAP then proceeds to set 540 the alarm attribute to action. An alarm event is then created 542, and the EAP creates 544 a PMS recovery unsuccessful event. The process then can proceed to incident qualification as described below.

If it is not possible of the device to do auto recovery at step 530, it is determined 550 if the device is managed by the EAP whereby the alarm management system 114 has the capability of resolving the alarm condition. If the device is not a managed device, then the alarm attribute for the actionable alarm is set 552 to action and a PMS alarm event is created 554 and the routine ends. If the device is a managed device, the alarm attribute for the actionable alarm is set 556 and a PMS alarm event is created 558. Instead of ending the routine, the routine then continues for incident qualification, which is described below.

Because the enhanced alarm processing routine described is temporarily suppressing alarms and initiating its own auto-recovery sequences as described above, there is a desire to replace alarms with non-alarm events. This is done to alert the operator that the system is in the process of an auto-recovery task and provides a record that can be rolled up into a summary report as well as be used in rating and ranking alarm conditions. There are at least four different recovery events including a system recovery action started, a system recovery action succeeded, a system recovery action unsuccessful and a system action recovery attempts exceeded. The action started event generates and presents to an operator when the EAP receives an out of service alarm. This allows an operator real time visibility into the recovery process since the alarm management system 114 will monitor the alarm until recovery concludes successfully or unsuccessfully. The action succeeded event is generated at the successful conclusion of a recovery attempt. The action unsuccessful event is generated when the device concludes that recovery is not successful. The recovery attempts exceeded is generated when the alarm management system 114 determines that the device has exceeded it recovery attempts and the alarm might as well get upgraded to actionable skipping the recovery timer time out.

Figure 6:
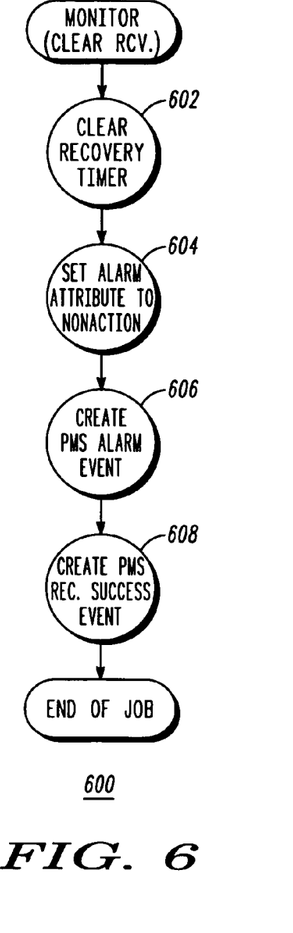
FIG. 6 is a flow chart illustrating the monitoring function of the alarm processing performed in accordance with the principles of the present invention.

FIG. 6 illustrates the steps 600 of the alarm management system 114 if the actionable alarm monitor determines if the there is an outstanding auto recovery if the alarm state is clear. To begin, the EAP clears 602 the recovery timer. The EAP then proceeds to set 604 the alarm attribute to non-actionable followed by creating 606 alarm event. Before ending the routine, the EAP creates 608 a PMS recovery success event.

Figure 7:
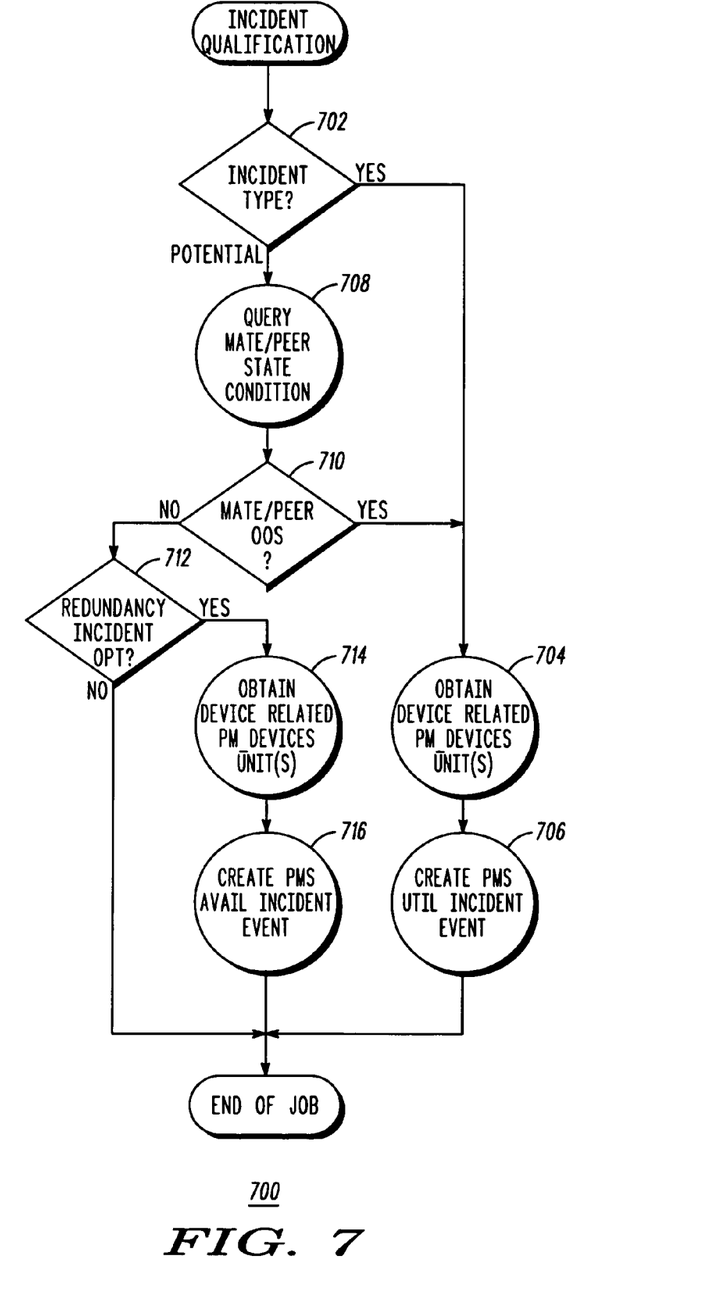
FIG. 7 is a flow chart illustrating an incident qualification routine in accordance with the principle of the present invention.

Turning to FIG. 7, the incident qualification routine 700 of the present invention is shown. At this point the alarm is classified as actionable and against a managed device in the system 100. Step 702 checks the source of the alarm. If the alarm originated from a performance management (PM) server, the alarm in theory must have had a service impact. Thus, an incident event is created and the process identifies and obtains 704 per devices within the same resource pool providing the same system service that are impacted by the service impact event. A PMS utility incident event is created 706.

If the alarm did not originate from the PM Server then a query 708 is needed to obtain the configuration to identify other redundant devices within the system 100 that may have provided backup functionality. The determination 710 of the other device being positive causes the routine to return to step 704. If the determination 710 is negative, the redundancy of the incidence is determined 712. If it there is no redundancy option set, the routine ends. If there is a redundancy incident option, an incident event is created and the process identifies and obtains 714 devices that are impacted by the service impact event. A PMS utility incident event is created 716.

Alarm conditions are "incident" alarms when the may have some degree of service impact to the system 100 by capacity degradation or complete failure. Furthermore, the relative degree of service impact is not easily discernible from looking at an isolated alarm event without additional data. By rating the alarm conditions by applying a weighting or cost model and ranking them from highest cost (greatest utilization loss) to lowest, a simple report can be maintained that provides the operator with a high level report highlighting the alarms that have the greatest impact to overall service utilization and hence need to be worked and resolved by the operator in the near term.

Once an incident event is received, the incident ranking module will run the rating algorithm based on previous stored measurements associate with the devices. The incident is then logged and rating is appended to the incident event for possible reference. These are the measurements or statistics that were obtained during the periodic intervals as well as alarm conditions are reported. Once the rating has been established, the rating is comparing to the rating of other incidents. Depending on the ranking created by the comparison the alarm condition can be displayed as a part of the rate and rank mechanism.

Figure 8:
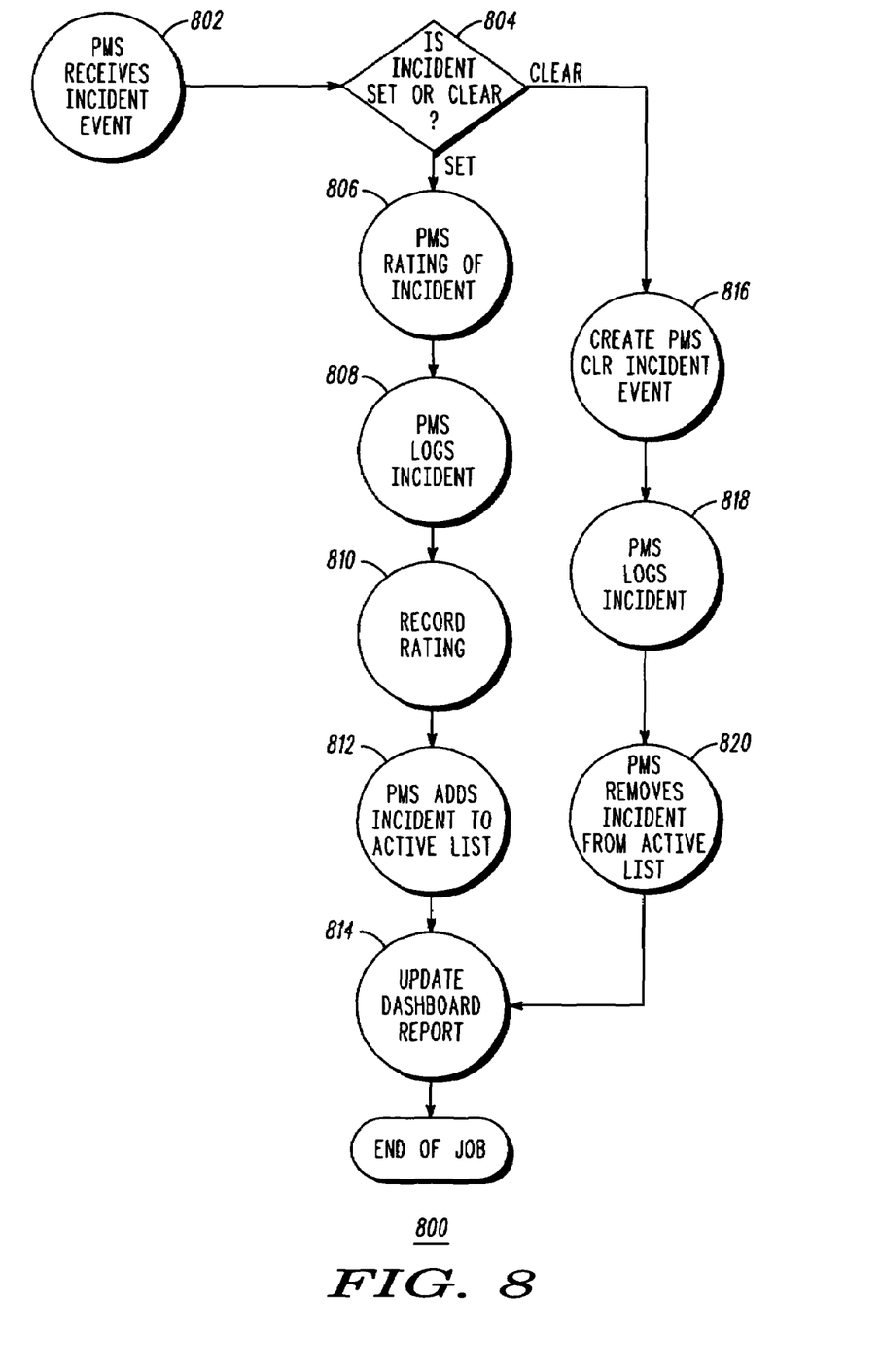
FIG. 8 is a flow chart illustrating an incident qualification mechanism in accordance with the principles of the present invention.

FIG. 8 illustrates the process of ranking an incident or alarm condition when the PMS receives 802 an incident event and determines 804 if the incident is set or clear. If the PMS receives an incident event whose condition is incident set, the PMS rates 806 the incident and logs 808 the incident. A record of the rating is also created 810. PMS then adds 812 the incident to an active incident list and the system 114 updates 814 the appropriate user interface, described below. If the PMS system receives an incident event whose condition is incident clear, the routine creates 816 a PMS clear incident event, logs 818 the incident, and moves the incident 820 from the active list to the historical list and updates 814 the appropriate user interface.

A utilization incident algorithm has been developed as a part of the present invention. The algorithm can be expressed as $(AW+BX+CY+DZ)+VIP$ where VIP is one of select group of fixed numbers that represent multiple tiers of status. Each system can have a different set of values for VIP. W represents the total lost utilization units in a first period of time, e.g. the first hour after the alarm condition occurs, where lost utilization is computed as zero if needed resources within the system 100 is less than or equal to available resources. Otherwise lost utilization is equal to the total measured usage for the sum of all pooled resources minus the total potential usage of all configured resources pooled. X represents the total lost utilization in another period of time, e.g. for the first 24 hours after the alarm condition has occurred, where lost utilization is computed as zero if needed resources is less than or equal to the available resources. Otherwise lost utilization is equal to the total measured usage for the sum of all pooled resources minus the total potential usage of all configured resources pooled. Y represents the utilization during a given period of time within a given interval. Z represents the total utilization loss in the given interval for the sum of the pooled resources. An availability incident rating algorithm has also been developed, which can be expressed as $(AW+BX+CY+DZ)*AGE$ where AGE is a counter that is incremented every given period of time. For example AGE can increase a value of 0.25 for every 24 hour period. Of course, different algorithms can be used depending on the requirements of the system and the alarm conditions being monitored.

Figure 9:
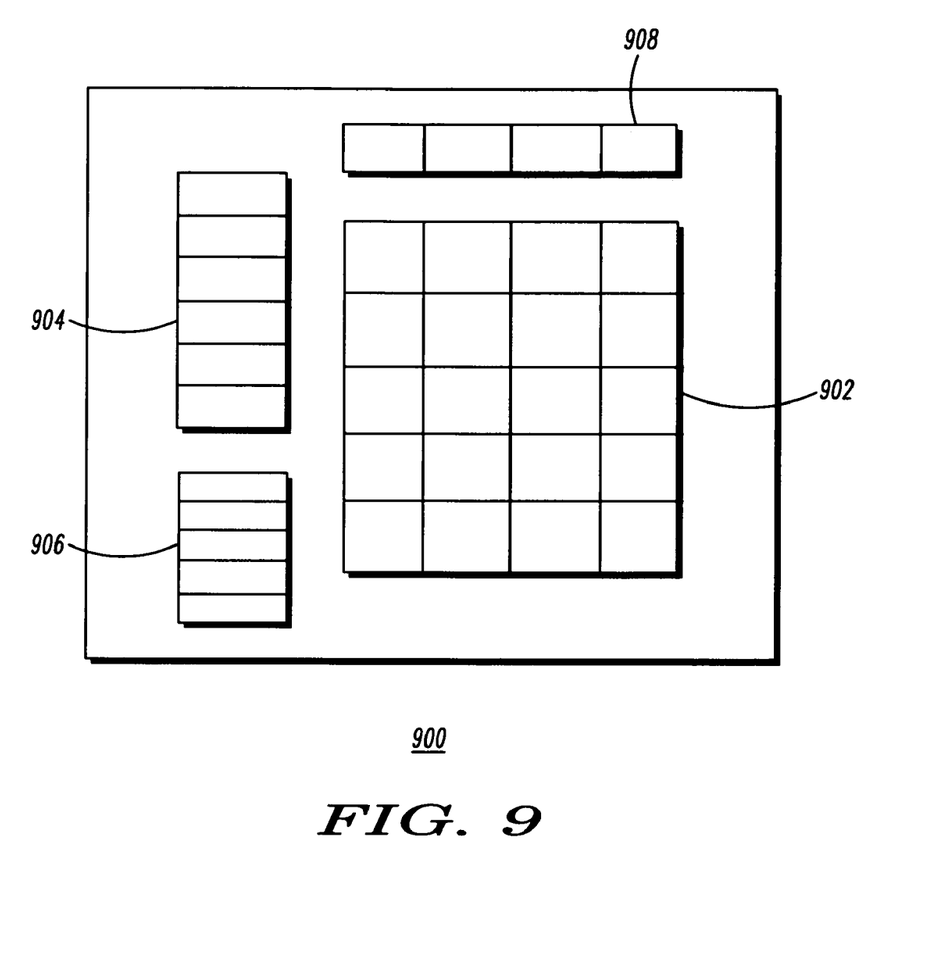
FIG. 9 is a user interface displaying the alarm conditions in accordance with the principles of the present invention.

FIG. 9 illustrates a user interface 900 that displays the actionable alarm and incidents as a part of the present invention. The user interface is used by the operators of the system 100 and management systems 202-208 to address and resolve alarm conditions and incidents. The user interface 900 includes an alarm listing 902 by network element, such as base stations or other network devices, and an alarm ranking listing 904. In addition, and incident reporting section 906 that reports those alarm conditions that have rated as service affecting incidents can be provided. A table menu 908 can be provided to allow an operator to change views of the user interface 900 according to the role played or the preferences of the operator. Thus, a display can be provided for base stations 102 or other network devices as well as according to differing alarm conditions.

The alarm listing 902 can take on many different configurations and lists the alarm conditions that are being reported to the alarm management systems. In one embodiment, the alarm listing 902 includes the most recent alarms and in another embodiment the alarm listing categorizes like alarm together or categorizes alarm conditions having similar severity levels or rankings together per network elements and devices. As can be appreciated, the alarm listings 902 can be configured in ways that are unique to each of the different operators of the alarm management system 114 depending on needs, requirements and preferences.

The alarm ranking listing 904 is subset of the alarm listing that takes the alarm or incident rankings and displays a given number of alarms in the ranking order. This provides the operator the ability to see the most significant alarm conditions and determine the need to have these alarm conditions resolved. As described above, the alarm ranking listing 904 can be dynamic such that it periodically changes depending on conditions on the network. Thus, events that were ranked can move up and down on the list depending on conditions and not just because an issue has been resolved.

In an embodiment of the invention, the alarm ranking listing 904 can be linked to the alarm listing 902. Thus if an operator selects an alarm on the alarm ranking listing, the operator can access the information available about that alarm through the alarm listing 902. The alarm listing 902 and the alarm ranking listing 904 can display the alarm condition together with the information that the system 114 has about the alarm. Such information can include the device or devices that are being affected by the alarm condition as well as the status of such devices. The time interval since the alarm condition has been reported, the effect of the alarm condition on the system 100 of the alarm conditions as well as other pertinent information.

As explained above, the data repository 210 can be memory location for the alarm management system 114 of the present invention. The data repository stores data about the different alarm conditions about which the alarm management system has knowledge. In addition, it stores data about the conditions of the system 100 and the devices that are in the devices over a period of time regardless of the current and past alarm conditions presented by the device. When, the alarm management system 114 begins operation, it can poll the devices and get initial information regarding the devices conditions. Each additional data point can be added. When the memory locations are full, known methods can be used to consolidate data points or delete older data.

In an embodiment of the invention, the alarm management system 114 and the operator interface 900 can link to the management systems 202-208 that are used to determine the alarm conditions. These links to management systems 202-208 can be used to resolve the alarm conditions. Thus, when an alarm condition is selected for resolution, the alarm management system 114 accesses the components and routines of the management systems 202-208 to resolve the alarm condition.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method of dynamically prioritizing network conditions for a communication system, the method comprising:
   receiving one of a plurality of alarm conditions indicating a fault in a device within the communication system;
   classifying the alarm condition;
   determining a status of the device;
   rating the alarm by comparing the classification of the alarm condition with the status of the device and determining quality of service impacts of the alarm and determining network conditions;
   ranking the rated alarm condition against another of the plurality of alarms;
   re-evaluating the ranking of alarm condition by repeating the determining and rating steps, and
   ranking the re-evaluated rated alarm condition against another of the plurality of alarms.

2. The method of claim 1 further comprising displaying the ranking of the rated alarm condition and the ranking of the re-evaluated rated alarm condition.

3. The method of claim 1 wherein the determining the status of the device comprising comparing a status of the device to at least one previous status of the device.

4. The method of claim 1 further comprising monitoring system conditions and storing conditions for use by the determining step.

5. The method of claim 4 wherein the determining step compares the status of the device to the stored conditions.

6. The method of claim 1 wherein classifying the alarm condition comprising classifying the alarm condition as one of a non-actionable condition, an actionable condition and a service impacting condition.

7. The method of claim 1 wherein the determining step comprising determining a configuration of system capacity.

8. The method of claim 1 wherein the rating step comprising comparing actual utilization of the device against historical utilization of the device.

9. The method of claim 1 further comprising comparing a weighting factor for prioritization of the alarm.

10. The method of claim 1 farther comprising calculating a utilization estimate of the device.

11. The method of claim 1 wherein the determining the status of the device further comprises determining the status of devices within an resource pool of devices.

12. A dynamic alarm management system for a system of multiple devices, the alarm management system comprising:
   a receiver for receiving alarm conditions of at least one of the devices and data regarding the status of the multiple devices in the system, and
   a processor coupled to the receiver wherein the processor classifies the alarm condition, determines the status of the devices, rates the alarm condition by comparing the classification of the alarm condition to the status of the devices and determining quality of service impacts of the alarm and determining network conditions, ranks the alarm condition by comparing the rated alarm condition to other alarm conditions, re-evaluates the rated alarm condition by repeating determining the status of the devices and rating the alarm condition by comparing the classification of the alarm condition to the status of the devices, and re-ranks the rated alarm condition by comparing the re-evaluated alarm condition to other alarm conditions.

13. The system of claim 12 further comprising a display for displaying the ranked alarm condition and the re-ranked alarm condition.

14. The system of claim 12 further comprising a memory for storing determined statuses.

15. The system of claim 12 wherein the processor further monitors network conditions and stores the monitored network conditions in a memory.

16. The system of claim 12 wherein the alarm conditions are one of a non-actionable alarm, an actionable alarm and a system impacting alarm.

17. The system of claim 12 wherein the processor ranks by comparing actual utilization of the device against historical use of the device.

18. The system of claim 12 wherein the processor further compares a weighting factor for prioritization of the alarm condition.

19. The system of claim 12 wherein the processor further determines the status of devices within a resource pool of devices.

20. The system of claim 12 wherein the processor farther compares the classified alarm condition to previous alarm conditions of the device.

* * * * *